Patented Feb. 8, 1938

2,107,279

UNITED STATES PATENT OFFICE 2,107,279

PRODUCTION OF REFRACTORY METALS AND ALLOYS

Clarence W. Balke and Claire C. Balke, Highland Park, Ill., assignors to Fansteel Metallurgical Corporation, a corporation of New York No Drawing. Application June 17, 1935, Serial No. 26,924

16 Claims. (Cl. 75—84)

This invention relates in general to the production or recovery of metals from metal bearing solids, and has more particular reference to the production or recovery of refractory metals.

Among the objects of the invention are the provision of an improved method of recovering from solids bearing the desired metal or alloy, a good, workable grade of substantially pure zirconium, titanium, hafnium, or combinations of two or more of them, with or without one or more metals of the group including tantalum and columbium, or one or more metals from either or both of those groups combined with one or more metals of the group including tungsten and molybdenum, which may be generally designated as one or more refractory metals from the Fourth Group of the Periodic Table of Elements with or without one or more refractory metals from the Fifth Group of the Periodic Table of Elements, or one or more metals from either or both of those groups combined with one or more refractory metals of the Sixth Group of the Periodic Table of Elements, whereby to utilize a relatively inexpensive source of such metals and alloys; whereby such metals and alloys of at least commercial purity may be economically recovered from solids bearing the indicated metals, whereby such metals and alloys are recovered in powder form and the size or mesh of the powder produced from the solids bearing the indicated metals or alloys of our novel method may be controlled in accordance with the size or mesh of the powder required for subsequent use of the metal or alloy so produced; and whereby in general to effect a material saving in the metallurgy of such refractory metals and their alloys by this novel process.

Other objects and advantages of the invention will appear more fully from the following description.

In order to accomplish the foregoing objects, a metallic solid rich in one or more refractory metals of the Fourth Group with or without one or more refractory metals of the Fifth Group, or one or more metals from either or both of those groups combined with minor percentages (e. g. up to 10%) of one or more refractory metals of the Sixth Group, in pieces of any size, is placed in a suitable vessel. The metallic mass is so heated in the presence of an embrittling gas, for example, hydrogen, as to promote the rapid absorption of hydrogen by the metallic mass. Rapid absorption of the hydrogen is promoted by heating the metal pieces in hydrogen at or above atmospheric pressure. The particular pressure and temperature employed in the heat treatment will vary with the composition of the metallic pieces, but will ordinarily range from five pounds per square inch to fifty pounds per square inch pressure and from 600° to 750° C. The metal is then slowly cooled or permitted to cool over a period of from one to two hours, until the temperature reaches about 500° C. It is permitted to cool further over a period of say three to ten hours until the temperature has dropped to about 100° C.

In this manner hydrogen is rapidly absorbed in large quantities by the metallic pieces, the larger proportion of hydrogen being absorbed during the very slow cooling from 500° C. down to 100° C. The rate of absorption of hydrogen between 500° C. and 100° C. is ordinarily relatively slow, but by starting the absorption of the hydrogen at the higher temperature of from 600° C. to 750° C., we have succeeded in increasing the rate of absorption at the lower temperatures.

When such metallic pieces are so treated with hydrogen, they become very brittle and friable and may easily be broken or pounded to a powder. We take advantage of this brittleness by grinding the embrittled metal preferably in a hammer mill to, say, from 100 to 200 mesh powder. It will be understood that the invention contemplates grinding the embrittled metal pieces in a burr mill and removing the impurities introduced in the mill by subsequently washing the powder in a suitable acid.

The hydrogenated powder is next slowly heated to about 900° C. while the hydrogen is removed by a vacuum pump. The heating and pumping is continued until a vacuum of from 100 to 300 microns is obtained, the time required for such vacuum depending upon the size and arrangement of the equipment.

When degasified as described above, the metal powder is not susceptible to caking or forming larger pieces of the metal. The size of the final powder may, therefore, be determined by the size or mesh to which the hydrogenated powder is ground, and is thus controlled by the grinding and degasifying operations. This hydrogenated ground and dehydrogenated powder may then be used in any desired manner for combining with other materials or may be pressed to a desired form and sintered to produce articles of manufacture.

In the production of the refractory metals and alloys mentioned above from ore, one of the final steps usually is that of sintering in order to effect a solidification of the metal particles. That sintering tends to remove some of the gaseous impurities from the metal with the result that the sintered products are substantially free from embrittling gases. Due to this fact, when such sintered products are used as the starting material in our process, the powder resulting from the dehydrogenation step of the invention has a high degree of purity. Metal scrap of such metals and alloys has been used as the starting material in our process. Frequently the metal alloy recovered from the scraps includes less hydrogen than some commercial forms of such metals or alloys. The metal or alloy resulting from the novel method as described above, has all of the properties of its commercial form.

While a preferred embodiment of the invention has been described, many modifications may be made without departing from the spirit of the invention. For example, in the hydrogenation of the pieces of metal or scrap, the pressure of the hydrogen may vary from one to two hundred pounds per square inch; the degasification temperature of the hydrogenated ground powder may vary between 600° C. and 1200° C.; and the heating and pumping during the dehydrogenation may continue until a vacuum of up to one thousand microns is obtained, the important conception being the heating of the metal or alloy in an atmosphere of an embrittling gas, such as hydrogen, at descending temperatures, and dehydrogenating the metal or alloy by heating it to a temperature at which the hydrogen absorbed, dissolved, or occluded by the metal or alloy is substantially reduced. The invention is not, therefore, limited to the precise details set forth above, but includes all changes within the spirit and scope of the appended claims.

Having thus described our invention, what we claim as new and desire to secure by Letters Patent of the United States, is:

1. A method of recovering metals of the group consisting of at least one of the refractory metals of the Fourth Group, alloys consisting of at least one of the refractory metals of the Fourth Group and at least one of the refractory metals of the Fifth Group, and alloys consisting of at least one of the refractory metals of the Fourth and Fifth Groups and minor proportions of at least one of the refractory metals of the Sixth Group, which comprises hydrogenating solid metallic pieces rich in the desired refractory metal or alloy, grinding the hydrogenated pieces, and heating the hydrogenated powder to the dehydrogenating temperature while exhausting the gases released from the powder as a result of the heating.

2. A method of recovering metals of the group consisting of at least one of the refractory metals of the Fourth Group, alloys consisting of at least one of the refractory metals of the Fourth Group and at least one of the refractory metals of the Fifth Group, and alloys consisting of at least one of the refractory metals of the Fourth and Fifth Groups and minor proportions of at least one of the refractory metals of the Sixth Group, which comprises heating solid metal rich in the desired refractory metal or alloy to from 600° to 750° centigrade in an atmosphere of hydrogen, slowly cooling said solid metal in the presence of hydrogen until the temperature reaches about 100° centigrade, whereby said solid metal is hydrogenated, and heating the hydrogenated solid metal in vacuo to from 600° to 1200° centigrade while maintaining the vacuum.

3. In the production of metals of the group consisting of at least one of the refractory metals of the Fourth Group, alloys consisting of at least one of the refractory metals of the Fourth Group and at least one of the refractory metals of the Fifth Group, and alloys consisting of at least one of the refractory metals of the Fourth and Fifth Groups and minor proportions of at least one of the refractory metals of the Sixth Group, the method of hydrogenating solid metal rich in the desired refractory metal or alloy preparatory to the purification thereof, which comprises heating said solid metal to from 600° to 750° centigrade in hydrogen at from 1 to 200 pounds per square inch pressure, whereby to increase the normal hydrogen absorption rate of said solid metal at lower temperatures, slowly cooling said solid metal in hydrogen to about 500° centigrade, and thereafter very slowly cooling said solid metal in hydrogen to substantially 100° centigrade.

4. A method of recovering metals of the group consisting of at least one of the refractory metals of the Fourth Group, alloys consisting of at least one of the refractory metals of the Fourth Group and at least one of the refractory metals of the Fifth Group, and alloys consisting of at least one of the refractory metals of the Fourth and Fifth Groups and minor proportions of at least one of the refractory metals of the Sixth Group, which comprises hydrogenating solid metallic pieces rich in the desired refractory metal or alloy, pulverizing the hydrogenated solid pieces, and dehydrogenating the pulverulent material.

5. A method of recovering metals of the group consisting of at least one of the refractory metals of the Fourth Group, alloys consisting of at least one of the refractory metals of the Fourth Group and at least one of the refractory metals of the Fifth Group, and alloys consisting of at least one of the refractory metals of the Fourth and Fifth Groups and minor proportions of at least one of the refractory metals of the Sixth Group, which comprises partially hydrogenating a solid product rich in the desired refractory metal or alloy by heating it to from 600° to 750° centigrade in the presence of hydrogen, whereby to increase the normal hydrogen absorption rate of said solid product at lower temperatures, completing the hydrogenation of said solid product at lower temperatures, pulverizing the hydrogenated solid product, and heating the pulverulent hydrogenated product in a vacuum.

6. A method of recovering metals of the group consisting of at least one of the refractory metals of the Fourth Group, alloys consisting of at least one of the refractory metals of the Fourth Group and at least one of the refractory metals of the Fifth Group, and alloys consisting of at least one of the refractory metals of the Fourth and Fifth Groups and minor proportions of at least one of the refractory metals of the Sixth Group, which comprises partially hydrogenating metallic pieces rich in the desired refractory metal or alloy by heating it at from 600° to 750° centigrade in the presence of hydrogen, whereby to increase the normal hydrogen absorption rate of said metallic pieces at lower temperatures, decreasing the temperature of said metallic pieces in the presence of hydrogen to about 500° centigrade, and thereafter to about 100° centigrade, whereby to complete the hydrogenation of said metallic pieces, grinding the hydrogenated metallic pieces, and heating the ground hydrogenated product in a vacuum.

7. A metallurgical method of recovering metals of the group consisting of at least one of the refractory metals of the Fourth Group, alloys consisting of at least one of the refractory metals of the Fourth Group and at least one of the refractory metals of the Fifth Group, and alloys consisting of at least one of the refractory metals of the Fourth and Fifth Groups and minor proportions of at least one of the refractory metals of the Sixth Group, which comprises heating in an atmosphere of hydrogen metallic pieces rich in the desired refractory metal or alloy, to a temperature at which said pieces become partially gasified and susceptible to further gasification at lower temperatures, decreasing the temperature of said metallic pieces in the presence of said hydrogen whereby to complete the gasification of the metallic pieces, pulverizing the gasified metallic pieces, and degasifying the puverulent mass by heating it in a vacuum.

8. A method of recovering metals of the group consisting of at least one of the refractory metals of the Fourth Group, alloys consisting of at least one of the refractory metals of the Fourth Group and at least one of the refractory metals of the Fifth Group, and alloys consisting of at least one of the refractory metals of the Fourth and Fifth Groups and minor proportions of at least one of the refractory metals of the Sixth Group, which comprises heating hydrogenated powder rich in the desired refractory metal or alloy to a temperature of from 600° to 1200° centigrade while exhausting the liberated gases until a vacuum of from 100 to 1000 microns is obtained.

9. A method of recovering metals of the group consisting of at least one of the refractory metals of the Fourth Group, alloys consisting of at least one of the refractory metals of the Fourth Group and at least one of the refractory metals of the Fifth Group, and alloys consisting of at least one of the refractory metals of the Fourth and Fifth Groups and minor proportions of at least one of the refractory metals of the Sixth Group, which comprises simultaneously dehydrogenating hydrogenated powder rich in the desired refractory metal or alloy and exhausting the gases liberated by the powder until a vacuum of from 100 to 1000 microns is obtained.

10. In the recovery of refractory metals of the group consisting of at least one of the refractory metals of the Fourth Group, alloys consisting of at least one of the refractory metals of the Fourth Group and at least one of the refractory metals of the Fifth Group, and alloys consisting of at least one of the refractory metals of the Fourth and Fifth Groups and minor proportions of at least one of the refractory metals of the Sixth Group, the metallurgical method which comprises hydrogenating solid metal rich in the desired refractory metal or alloy for embrittling it, pulverizing the embrittled product, and degasifying the pulverulent mass.

11. In the production of refractory metal ingots from less desirable shapes of said metal, the method which comprises heating at least one of the refractory metals of the Fourth Group in the presence of hydrogen to embrittle the same, pulverizing the embrittled metal, degasifying the pulverulent mass, pressing the powder into bars and sintering the bars to produce the desired ingot.

12. In the production of refractory metal ingots from less desirable shapes of said metal, the method which comprises heating alloys consisting of at least one of the refractory metals of the Fourth Group and at least one of the refractory metals of the Fifth Group in the presence of hydrogen to embrittle the same, pulverizing the embrittled metal, degasifying the pulverulent mass, pressing the powder into bars and sintering the bars to produce the desired ingot.

13. In the production of refractory metal ingots from less desirable shapes of said metal, the method which comprises heating alloys consisting of at least one of the refractory metals of the Fourth and Fifth Groups and minor proportions of at least one of the refractory metals of the Sixth Group, in the presence of hydrogen to embrittle the same, pulverizing the embrittled metal, degasifying the pulverulent mass, pressing the powder into bars and sintering the bars to produce the desired ingot.

14. A method of producing in powdered form at least one of the refractory metals of the Fourth Group, which comprises partially hydrogenating a solid product rich in the desired refractory metal or alloy by heating it to from 600° to 750° centigrade, in the presence of hydrogen, whereby to increase the normal hydrogen absorption rate of said solid product at lower temperatures, completing the hydrogenation of said solid product at lower temperatures, pulverizing the hydrogenated solid product, and heating the pulverulent hydrogenated product in a vacuum to produce the desired powdered refractory metal.

15. A method of producing in powdered form alloys consisting of at least one of the refractory metals of the Fourth Group and at least one of the refractory metals of the Fifth Group, which comprises partially hydrogenating a solid product rich in the desired refractory metal or alloy by heating it to from 600° to 750° centigrade in the presence of hydrogen, whereby to increase the normal hydrogen absorption rate of said solid product at lower temperatures, completing the hydrogenation of said solid product at lower temperatures, pulverizing the hydrogenated solid product and heating the pulverulent hydrogenated product in a vacuum to produce the desired powdered refractory metal.

16. A method of producing in powdered form alloys consisting of at least one of the refractory metals of the Fourth and Fifth Groups and minor proportions of at least one of the refractory metals of the Sixth Group, which comprises partially hydrogenating a solid product rich in the desired refractory metal or alloy by heating it to from 600° to 750° centigrade in the presence of hydrogen, whereby to increase the normal hydrogen absorption rate of said solid product at lower temperatures, completing the hydrogenation of said solid product at lower temperatures, pulverizing the hydrogenated solid product, and heating the pulverulent hydrogenated product in a vacuum to produce the desired powdered refractory metal.

CLARENCE W. BALKE.
CLAIRE C. BALKE.